United States Patent
Shao et al.

(10) Patent No.: US 12,399,332 B2
(45) Date of Patent: Aug. 26, 2025

(54) OPTICAL MODULE

(71) Applicant: HISENSE BROADBAND MULTIMEDIA TECHNOLOGIES CO., LTD., Shandong (CN)

(72) Inventors: Qian Shao, Shandong (CN); Weiwei Liu, Shandong (CN); Jianwei Yao, Shandong (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 239 days.

(21) Appl. No.: 18/126,782

(22) Filed: Mar. 27, 2023

(65) Prior Publication Data

US 2023/0228957 A1 Jul. 20, 2023

Related U.S. Application Data

(63) Continuation of application No. PCT/CN2021/134352, filed on Nov. 30, 2021.

(30) Foreign Application Priority Data

Jan. 8, 2021 (CN) .......................... 202110024351.6
Jan. 8, 2021 (CN) .......................... 202110026033.3

(51) Int. Cl.
*H04B 10/00* (2013.01)
*G02B 6/42* (2006.01)

(52) U.S. Cl.
CPC ........... *G02B 6/428* (2013.01); *G02B 6/4238* (2013.01); *G02B 6/4292* (2013.01)

(58) Field of Classification Search
CPC .... G02B 6/428; G02B 6/4238; G02B 6/4292; G02B 6/4279; G02B 6/4251; G02B 6/4284

See application file for complete search history.

(56) References Cited

U.S. PATENT DOCUMENTS 7,144,788 B2 * 12/2006 Kihara ................. G02B 6/4279
257/E21.44
7,439,449 B1 * 10/2008 Kumar .................. H05K 1/147
174/254

(Continued)

FOREIGN PATENT DOCUMENTS

CN 104459907 A 3/2015
CN 104730656 A 6/2015

(Continued)

OTHER PUBLICATIONS

First Chinese Office Action dated Nov. 3, 2022 in corresponding Chinese Application No. 202110026033.3, translated, 19 pages.

(Continued)

*Primary Examiner* — Agustin Bello
(74) *Attorney, Agent, or Firm* — MH2 TECHNOLOGY LAW GROUP LLP

(57) ABSTRACT

An optical module includes a housing, a circuit board, a package, and at least one of a light-emitting assembly or a light receiving assembly. The package includes a package body and a soldering member. The package body includes a cavity. An end of the circuit board is inserted into the cavity, and the soldering member is located in a gap between the circuit board and the package body. The light-emitting assembly or the light receiving assembly is located in the cavity and electrically connected to the circuit board. The light-emitting assembly is configured to convert an electrical signal from the circuit board into an optical signal and emit the optical signal to an outside of the optical module, and the light receiving assembly is configured to convert the optical signal from the outside of the light module into an electric signal and transmit the electric signal to the circuit board.

19 Claims, 9 Drawing Sheets

(56) References Cited

U.S. PATENT DOCUMENTS

| | | | | |
|---|---|---|---|---|
| 8,644,357 B2* | 2/2014 | Liu | H01S 5/0235 | 372/36 |
| 8,750,659 B2* | 6/2014 | Ban | G02B 6/421 | 385/33 |
| 8,774,568 B2* | 7/2014 | Han | G02B 6/4206 | 398/199 |
| 9,042,735 B2* | 5/2015 | Shah | H05K 1/148 | 385/92 |
| 9,363,021 B2* | 6/2016 | Fujimura | H04B 10/60 | |
| 9,538,637 B2* | 1/2017 | Zhao | G01J 1/0425 | |
| 9,548,817 B1* | 1/2017 | Nagarajan | H01S 5/0064 | |
| 9,568,694 B2* | 2/2017 | Mizobuchi | G02B 6/4279 | |
| 9,632,260 B2* | 4/2017 | Mizobuchi | G02B 6/428 | |
| 9,671,580 B1* | 6/2017 | Nagarajan | G02B 6/428 | |
| 9,971,113 B2* | 5/2018 | Hara | G02B 6/425 | |
| 10,018,794 B2* | 7/2018 | Sun | G02B 6/4206 | |
| 10,313,024 B1* | 6/2019 | Ho | H04B 10/50 | |
| 10,348,399 B2* | 7/2019 | Teranishi | H04B 10/032 | |
| 10,361,533 B2* | 7/2019 | Sato | H01S 5/02216 | |
| 10,416,400 B2* | 9/2019 | Yamauchi | G02B 6/4204 | |
| 10,484,121 B2* | 11/2019 | Nakayama | G02B 6/4284 | |
| 10,680,404 B2* | 6/2020 | Komatsu | H01S 5/02257 | |
| 10,754,111 B1* | 8/2020 | Chan | G02B 6/4246 | |
| 10,791,620 B2* | 9/2020 | Chen | H05K 1/0216 | |
| 10,816,739 B2* | 10/2020 | Ding | G02B 6/4286 | |
| 10,948,671 B2* | 3/2021 | Lin | H04J 14/0256 | |
| 11,561,351 B2* | 1/2023 | Sun | G02B 6/428 | |
| 11,728,895 B2* | 8/2023 | Luo | G02B 6/4251 | 398/139 |
| 11,768,341 B2* | 9/2023 | Kanazawa | G02B 6/4279 | 385/89 |
| 12,040,587 B2* | 7/2024 | Miyata | H01S 5/02415 | |
| 12,191,629 B2* | 1/2025 | Tabata | H01S 5/0239 | |
| 2003/0128552 A1* | 7/2003 | Takagi | G02B 6/4221 | 362/555 |
| 2004/0163836 A1* | 8/2004 | Kumar | H01S 5/02375 | 257/E23.19 |
| 2005/0213882 A1* | 9/2005 | Go | H01S 5/02216 | 385/37 |
| 2005/0214957 A1* | 9/2005 | Kihara | H01S 5/02216 | 438/106 |
| 2005/0244111 A1* | 11/2005 | Wolf | G02B 6/4214 | 385/14 |
| 2006/0032665 A1* | 2/2006 | Ice | H05K 1/189 | 174/262 |
| 2007/0053639 A1* | 3/2007 | Aruga | G02B 6/4281 | 385/94 |
| 2009/0003398 A1* | 1/2009 | Moto | H01S 5/02375 | 372/36 |
| 2011/0008056 A1* | 1/2011 | Yagisawa | H05K 1/147 | 174/254 |
| 2012/0128290 A1* | 5/2012 | Han | G02B 6/4208 | 385/14 |
| 2012/0128300 A1* | 5/2012 | Ban | G02B 6/421 | 385/33 |
| 2013/0001410 A1* | 1/2013 | Zhao | H05K 1/115 | 174/262 |
| 2013/0114629 A1* | 5/2013 | Firth | H01S 5/02208 | 372/20 |
| 2013/0148966 A1* | 6/2013 | Kurokawa | H04B 10/506 | 398/65 |
| 2014/0138148 A1* | 5/2014 | Lee | H02G 3/22 | 174/650 |
| 2014/0140665 A1* | 5/2014 | Akashi | G02B 6/4281 | 385/89 |
| 2015/0338588 A1* | 11/2015 | Matsui | H05K 3/3421 | 29/831 |
| 2016/0154177 A1* | 6/2016 | Han | G02B 6/4251 | 385/14 |
| 2016/0170145 A1* | 6/2016 | Kawamura | G02B 6/32 | 250/226 |
| 2016/0291271 A1* | 10/2016 | Mizobuchi | G02B 6/428 | |
| 2016/0291272 A1* | 10/2016 | Sun | H05K 3/4691 | |
| 2018/0149818 A1* | 5/2018 | Yamauchi | G02B 6/4279 | |
| 2019/0052049 A1* | 2/2019 | Sato | H01S 5/4012 | |
| 2019/0182949 A1* | 6/2019 | Misawa | H05K 1/118 | |
| 2020/0116961 A1* | 4/2020 | Ding | G02B 6/4256 | |
| 2021/0104865 A1* | 4/2021 | Hu | H01S 5/4087 | |
| 2021/0247576 A1* | 8/2021 | Oomori | G02B 6/2938 | |
| 2022/0326455 A1* | 10/2022 | Kanazawa | G02B 6/4244 | |
| 2023/0228957 A1* | 7/2023 | Shao | G02B 6/4238 | 385/92 |
| 2023/0258887 A1* | 8/2023 | Jiang | G02B 6/4263 | 385/89 |
| 2024/0039634 A1* | 2/2024 | Luo | G02B 6/4246 | |
| 2024/0431022 A1* | 12/2024 | Jacques | H05K 1/0237 | |

FOREIGN PATENT DOCUMENTS

| | | |
|---|---|---|
| CN | 205350898 U | 6/2016 |
| JP | 2013044952 A | 3/2013 |

OTHER PUBLICATIONS

First Chinese Office Action dated Nov. 2, 2022 in corresponding Chinese Application No. 202110024351.6, translated, 15 pages.

International Search Report and Written Opinion dated Jan. 27, 2022 in corresponding International Application No. PCT/CN2021/134352, translated, 17 pages.

* cited by examiner

OPTICAL MODULE

CROSS-REFERENCE TO RELATED APPLICATIONS

This application is a continuation application of International Patent Application No. PCT/CN2021/134352, filed on Nov. 30, 2021, which claims priorities to Chinese Patent Application No. 202110024351.6, filed on Jan. 8, 2021, and Chinese Patent Application No. 202110026033.3, filed on Jan. 8, 2021, which are incorporated herein by reference in their entireties.

TECHNICAL FIELD

The present disclosure relates to the field of optical communication technologies, and in particular, to an optical module.

BACKGROUND

With the development of cloud computing, mobile Internet, video, and other new business and application scenarios, the development and progress of optical communication technology has become more and more important. In optical communication technology, the optical module is a tool for achieving interconversion between an optical signal and an electrical signal and is one of the key components in optical communication devices. With the development of optical communication technology, it is required that the transmission rate of optical modules continues to increase.

SUMMARY

An optical module is provided. The optical module includes a housing, a circuit board, a package, and at least one of a light-emitting assembly or a light receiving assembly. The circuit board is located in the housing. The circuit board includes a circuit board body, an upper surface, a lower surface, a first circuit, a second circuit, and an internal circuit. The lower surface is disposed opposite to the upper surface; the first circuit is disposed on the upper surface; the second circuit is disposed on the upper surface; and the internal circuit is disposed on a middle layer of the circuit board body. The package is located in the housing. The package includes a package body and a soldering member. The soldering member is located in a gap between the circuit board and the package body. The package body includes a cavity, a socket, an optical window opening, and an optical window. The first circuit is disposed on an end of the circuit board body inserted into a cavity. The second circuit is disposed on an end of the circuit board body opposite to the first circuit and located outside the package body. The socket is communicated with the cavity, and an end of the circuit board is inserted into the cavity through the socket. The optical window opening is disposed opposite to the socket. The optical window is located at the optical window opening. The light-emitting assembly or the light receiving assembly is located in the cavity and is electrically connected to the circuit board. The light-emitting assembly is configured to convert an electrical signal from the circuit board into an optical signal and emit the optical signal to an outside of the optical module, and the light receiving assembly is configured to convert the optical signal from the outside of the light module into an electric signal and transmit the electric signal to the circuit board. At least one of the light-emitting assembly or the light receiving assembly is electrically connected to the first circuit, and the first circuit is electrically connected to the second circuit through the internal circuit. At least one of the optical signal emitted by the light-emitting assembly or the optical signal received by the light receiving assembly is transmitted through the optical window.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely some embodiments of the present disclosure, and a person of ordinary skill in the art may obtain other drawings according to these drawings. In addition, the accompanying drawings to be described below may be regarded as schematic diagrams and are not limitations on an actual size of a product, an actual process of a method and an actual timing of a signal to which the embodiments of the present disclosure relate.

DETAILED DESCRIPTION

Figure 1:
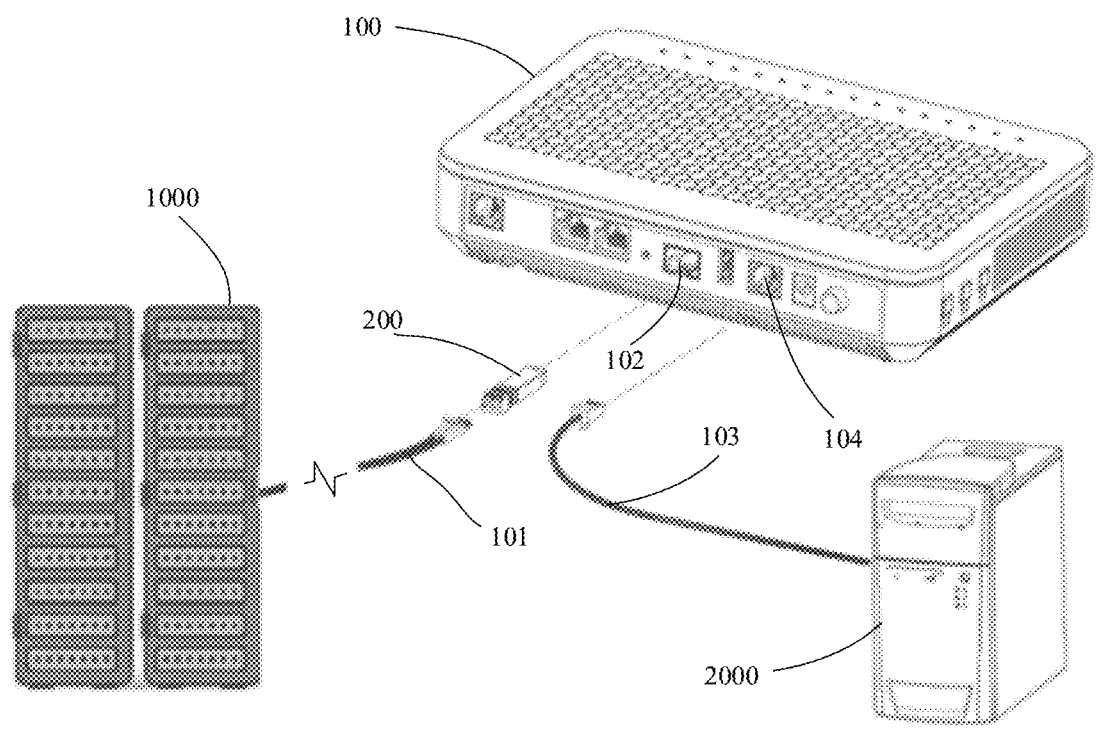
FIG. 1 is a diagram showing a connection relationship of an optical communication terminal, in accordance with some embodiments.

The technical solutions in some embodiments of the present disclosure will be described clearly and completely with reference to the accompanying drawings; however, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only and are not to be construed as indicating or implying the relative importance or implicitly indicating the number of indicated technical features. Thus, the features defined by "first" and "second" may explicitly or implicitly include one or more of the features. In the description of the embodiments of the present disclosure, the terms such as "a plurality of," "the plurality of," and "multiple" each mean two or more unless otherwise specified.

In the description of some embodiments, the terms "coupled" and "connected" and their derivatives may be used. The term "connected" should be understood broadly. For example, the term "connected" may be a fixed connection, a detachable connection, or an integral connection; and it may be a direct connection or an indirect connection through an intermediate medium. However, the term "coupled" or "communicatively coupled" may also mean that two or more components are not in direct contact with each other but still cooperate or interact with each other. The embodiments disclosed herein are not necessarily limited to the content herein.

The phrase "at least one of A, B, and C" has the same meaning as the phrase "at least one of A, B, or C," and they both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

The use of the phrase "applicable to" or "configured to" herein means an open and inclusive expression, which does not exclude devices applicable to or configured to perform additional tasks or steps.

The term such as "about," "substantially," or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

Exemplary embodiments are described herein with reference to sectional views and/or plan views as idealized exemplary drawings. Therefore, variations in shapes with respect to the accompanying drawings due to, for example, manufacturing technologies and/or tolerances may be envisaged. Therefore, the exemplary embodiments should not be construed as being limited to the shapes of the regions shown herein, but including deviations due to, for example, ideally, an outline of an orthographic projection of a film pattern on a certain plane has a rectangular shape. Thus, the regions shown in the accompanying drawings are schematic in nature, and their shapes are not intended to show actual shapes of regions in a device and are not intended to limit the scope of the exemplary embodiments.

In an optical communication system, an optical signal is used to carry information to be transmitted, and the optical signal carrying the information is transmitted to an information processing device such as a computer through an information transmission device such as an optical fiber or an optical waveguide, so as to achieve transmission of the information. Since light has a characteristic of passive transmission when being transmitted through the optical fiber or the optical waveguide, low-cost and low-loss information transmission may be achieved. In addition, since a signal transmitted by the information transmission device such as the optical fiber or the optical waveguide is an optical signal, and a signal that may be recognized and processed by the information processing device such as a computer is an electrical signal, in order to establish information connection between the information transmission device such as the optical fiber or the optical waveguide and the information processing device such as the computer, there is a need to achieve interconversion between the electrical signal and the optical signal.

In the field of optical communication technology, an optical module may achieve the interconversion between the optical signal and the electrical signal. The optical module includes an optical port and an electrical port. The optical module achieves optical communication with the information transmission device such as the optical fiber or the optical waveguide through the optical port and achieves electrical connection with an optical network terminal (e.g., an optical modem) through the electrical port. The electrical connection is mainly used for power supply, inter-integrated circuit (I2C) signal transmission, data information transmission, grounding, and the like. The optical network terminal transmits the electrical signal to the information processing device such as the computer through a network cable or wireless fidelity (Wi-Fi).

FIG. 1 is a diagram showing a connection relationship of an optical communication system, in accordance with some embodiments. As shown in FIG. 1, the optical communication system includes a remote server 1000, a local information processing device 2000, an optical network terminal 100, an optical module 200, an optical fiber 101, and a network cable 103.

One end of the optical fiber 101 is connected to the remote server 1000, and another end of the optical fiber 101 is connected to the optical network terminal 100 through the optical module 200. An optical fiber itself may support long-distance signal transmission, such as signal transmission over several kilometers (6 kilometers to 8 kilometers). On this basis, if a repeater is used, in theory, infinite distance transmission may be realized. Therefore, in a typical optical communication system, a distance between the remote server 1000 and the optical network terminal 100 may typically reach several kilometers, tens of kilometers, or hundreds of kilometers.

One end of the network cable 103 is connected to the local information processing device 2000, and another end of the network cable 103 is connected to the optical network terminal 100. The local information processing device 2000 includes one or more of a router, a switch, a computer, a mobile phone, a tablet computer, or a television.

A physical distance between the remote server 1000 and the optical network terminal 100 is greater than a physical distance between the local information processing device 2000 and the optical network terminal 100. Connection between the local information processing device 2000 and the remote server 1000 is accomplished by the optical fiber 101 and the network cable 103, and connection between the optical fiber 101 and the network cable 103 is accomplished by the optical module 200 and the optical network terminal 100.

The optical module 200 includes an optical port and an electrical port. The optical port is configured to connect to the optical fiber 101, so that bidirectional optical signal connection is established between the optical module 200 and the optical fiber 101. The electrical port is configured to connect to the optical network terminal 100, so that bidirectional electrical signal connection is established between the optical module 200 and the optical network terminal 100. Interconversion between the optical signal and the electrical signal is achieved by the optical module 200, so that information connection between the optical fiber 101 and the optical network terminal 100 is established. For example, an optical signal from the optical fiber 101 is converted into an electrical signal by the optical module 200 and then the electrical signal is input into the optical network terminal 100, and an electrical signal from the optical network terminal 100 is converted into an optical signal by the optical module 200 and then the optical signal is input into the optical fiber 101. Since the optical module 200 is a tool for achieving the interconversion between the optical signal and the electrical signal and has no function of data processing, the information does not change in the photoelectric conversion process described above.

The optical network terminal 100 includes a housing in a substantially cuboid shape, and an optical module interface 102 and a network cable interface 104 that are disposed on the housing. The optical module interface 102 is configured to connect to the optical module 200, so that the bidirectional electrical signal connection between the optical network terminal 100 and the optical module 200 is established. The network cable interface 104 is configured to connect to the network cable 103, so that bidirectional electrical signal connection between the optical network terminal 100 and the network cable 103 is established. Connection between the optical module 200 and the network cable 103 is established through the optical network terminal 100. For example, the optical network terminal 100 transmits the electrical signal from the optical module 200 to the network cable 103 and transmits the electrical signal from the network cable 103 to the optical module 200. Therefore, the optical network terminal 100, as a master monitor of the optical module 200, may monitor an operation of the optical module 200. In addition to the optical network terminal 100, the master monitor of the optical module 200 may further include an optical line terminal (OLT).

A bidirectional signal transmission channel is established between the remote server 1000 and the local information processing device 2000 through the optical fiber 101, the optical module 200, the optical network terminal 100, and the network cable 103.

Figure 2:
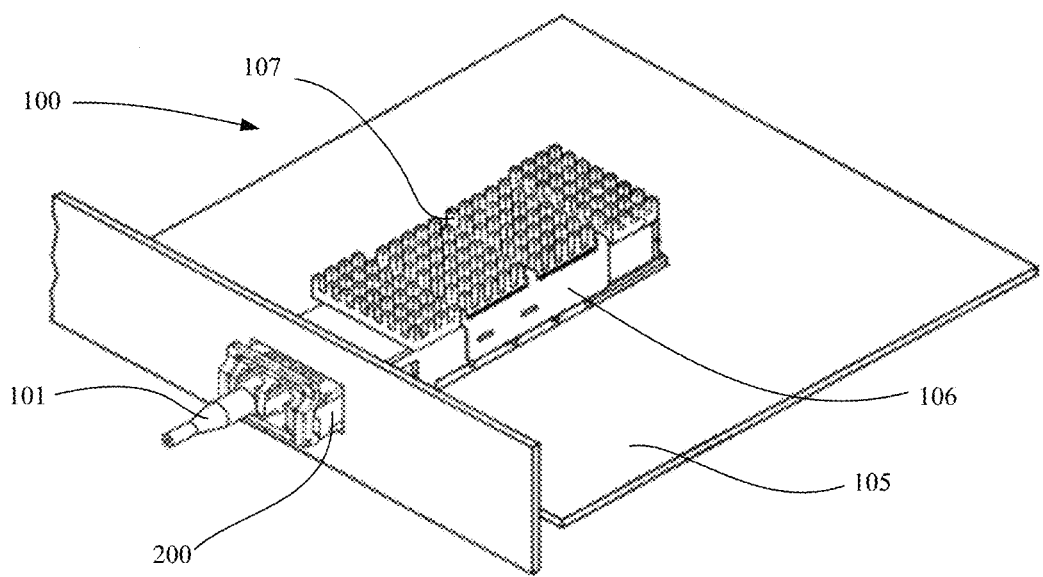
FIG. 2 is a structural diagram of an optical network terminal, in accordance with some embodiments.

FIG. 2 is a structural diagram of an optical network terminal. In order to clearly show a connection relationship between the optical module 200 and the optical network terminal 100, FIG. 2 only shows structures of the optical network terminal 100 that are related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to connect to the electrical port of the optical module 200, and the heat sink 107 has protruding portions such as fins for increasing a heat dissipation area.

The optical module 200 is inserted into the cage 106 of the optical network terminal 100, and the optical module 200 is fixed by the cage 106. Heat generated by the optical module 200 is conducted to the cage 106 and then is dissipated through the heat sink 107. After the optical module 200 is inserted into the cage 106, the electrical port of the optical module 200 is connected to the electrical connector inside the cage 106, so that the bidirectional electrical signal connection between the optical module 200 and the optical network terminal 100 is established. In addition, the optical port of the optical module 200 is connected to the optical fiber 101, so that the bidirectional optical signal connection between the optical module 200 and the external optical fiber 101 is established.

Figure 3:
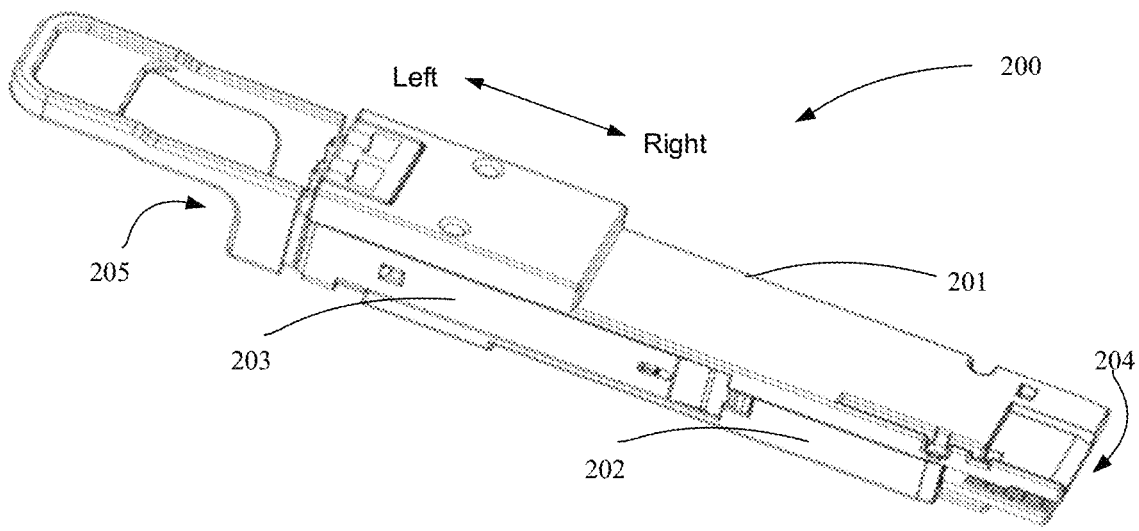
FIG. 3 is a structural diagram of an optical module, in accordance with some embodiments.
Figure 4:
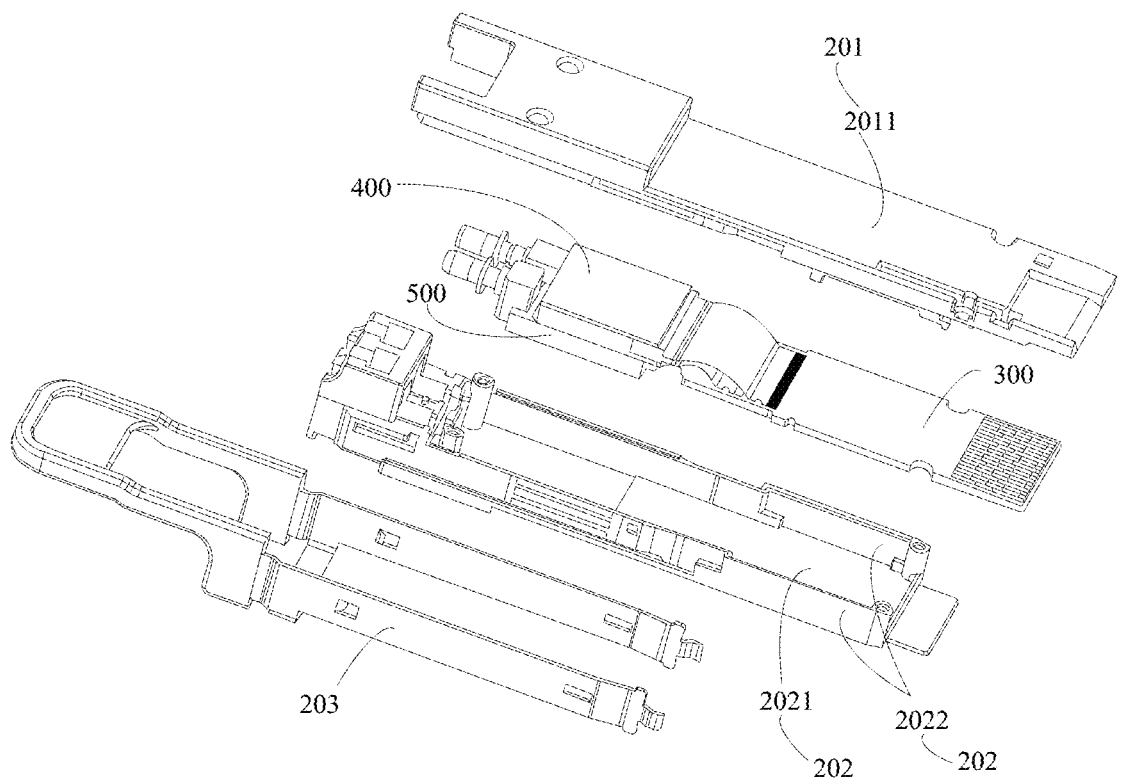
FIG. 4 is an exploded view of an optical module, in accordance with some embodiments.

FIG. 3 is a structural diagram of an optical module, in accordance with some embodiments. FIG. 4 is an exploded view of an optical module, in accordance with some embodiments. As shown in FIGS. 3 and 4, the optical module 200 includes a shell and a circuit board 300, a light-emitting assembly 400, and a light receiving assembly 500 that are disposed inside the shell.

The shell includes an upper shell 201 and a lower shell 202, and the upper shell 201 covers the lower shell 202 to form the shell having two openings. An outer contour of the shell is generally in a cuboid shape.

In some embodiments of the present disclosure, the lower shell 202 includes a bottom plate 2021 and two lower side plates 2022 that are located on two sides of the bottom plate 2021 and disposed perpendicular to the bottom plate 2021. The upper shell 201 includes a cover plate 2011, and the cover plate 2011 covers the two lower side plates 2022 of the lower shell 202 to form the shell.

In some embodiments, the upper shell 201 includes a cover plate 2011 and two upper side plates that are located on two sides of the cover plate 2011 and disposed perpendicular to the cover plate 2011. The two upper side plates are combined with the two lower side plates, so that the upper shell 201 covers the lower shell 202.

A direction in which a connecting line between the two openings 204 and 205 extends may be the same as a length direction of the optical module 200 or may not be the same as the length direction of the optical module 200. For example, the opening 204 is located at an end (a right end in FIG. 3) of the optical module 200, and the opening 205 is also located at an end (a left end in FIG. 3) of the optical module 200. Alternatively, the opening 204 is located at an end of the optical module 200, and the opening 205 is located at a side of the optical module 200. The opening 204 is the electrical port, and a connecting finger 301 of the circuit board 300 protrudes from the electrical port, and is inserted into the master monitor (e.g., the optical network terminal 100). The opening 205 is the optical port and is configured to connect to an external optical fiber 101, so that the optical fiber 101 is connected to the light-emitting assembly 400 and the light receiving assembly 500 inside the optical module 200.

By adopting an assembly mode of combining the upper shell 201 with the lower shell 202, it is possible to facilitate installation of elements such as the circuit board 300, the light-emitting assembly 400, and the light receiving assembly 500 into the shell, and the upper shell 201 and the lower shell 202 may provide encapsulation and protection for these elements. In addition, in a case where elements such as the circuit board 300, the light transmit-emitting assembly 400, and the light receiving assembly 500 are assembled, it is possible to facilitate an arrangement of positioning components, heat dissipation components, and electromagnetic shielding components of these elements, which is conducive to implementation of automated production.

In some embodiments, the upper shell 201 and the lower shell 202 are generally made of a metal material, which is conducive to electromagnetic shielding and heat dissipation.

In some embodiments, the optical module 200 further includes an unlocking component 203 located outside the shell thereof, and the unlocking component 203 is configured to implement a fixed connection between the optical module 200 and the master monitor or to release a fixed connection between the optical module 200 and the master monitor.

For example, the unlocking component 203 is located on outer sides of the two lower side plates 2022 of the lower shell 202 and has an engagement component that is matched with the cage of the master monitor (e.g., the cage 106 of the optical network terminal 100). In a case where the optical module 200 is inserted into the cage of the master monitor, the engagement component of the unlocking component 203 fixes the optical module 200 in the cage of the master monitor. When the unlocking component 203 is pulled, the engagement component of the unlocking component 203 moves along with the unlocking component 203, and then a connection relationship between the engagement component and the master monitor is changed to release the engagement relationship between the optical module 200 and the master monitor, so that the optical module 200 may be drawn out of the cage of the master monitor.

The circuit board 300 includes circuit traces, electronic elements, and chips. Through the circuit traces, the electronic elements and chips are connected together according to a circuit design, so as to implement functions such as power supply, transmission of an electrical signal, and grounding. The electronic elements include, for example, a capacitor, a resistor, a triode, and a metal-oxide-semiconductor field-effect transistor (MOSFET). The chips include, for example, a microcontroller unit (MCU), a limiting amplifier, a clock and data recovery (CDR) chip, a power management chip, a digital signal processing (DSP) chip, or a transimpedance amplifier (TIA).

The circuit board 300 is generally a rigid circuit board, and the rigid circuit board may also implement a support function due to its relatively hard material. For example, the rigid circuit board may stably support the electronic elements and the chips. The rigid circuit board may also be inserted into the electrical connector inside the cage 106 of the master monitor.

The circuit board 300 further includes the connecting finger formed on an end surface thereof, and the connecting finger is composed of a plurality of independent pins. The circuit board 300 is inserted into the cage 106 and is conductively connected to the electrical connector inside the cage 106 through the connecting finger. The connecting finger may be disposed on only one surface (e.g., an upper surface shown in FIG. 4) of the circuit board 300 or may be disposed on both upper and lower surfaces of the circuit board 300 to adapt to an occasion where a large number of pins are needed. The connecting finger 301 is configured to establish electrical connection with the master monitor, so as to implement functions such as power supply, grounding, 120 signal transmission, or data signal transmission.

Of course, flexible circuit boards are also used in some optical modules. A flexible circuit board is generally used in conjunction with a rigid circuit board as a supplement for the rigid circuit board.

In order to improve the transmission rate of the optical module 200 and adapt to various harsh environments, the light-emitting assembly 400 and the light receiving assembly 500 of the optical module 200 need to be airtight. Therefore, the light-emitting assembly 400 and the light receiving assembly 500 are generally of a hermetic package structure.

Figure 5:
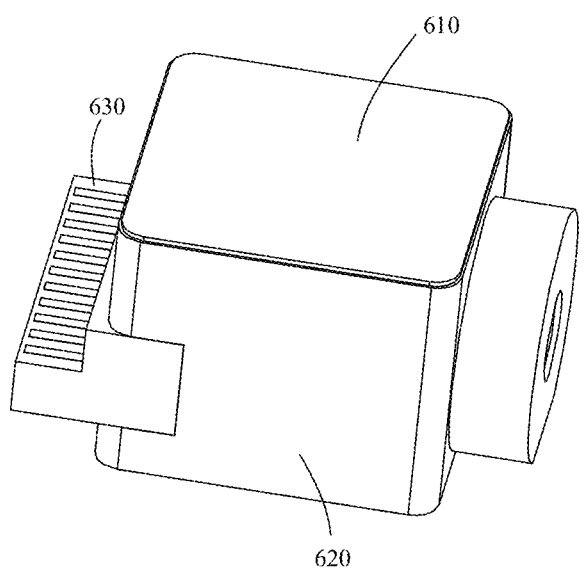
FIG. 5 is a structural diagram of an airtight package of an optical module in the related art.
Figure 6:
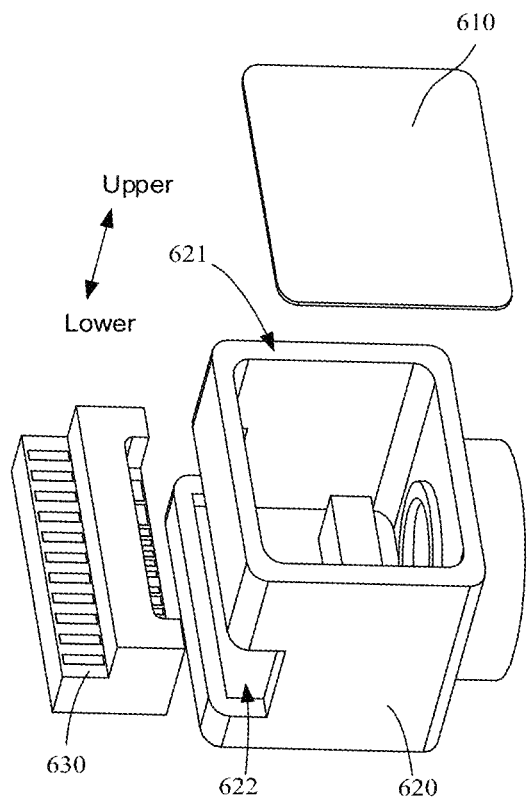
FIG. 6 is an exploded view of an airtight package of an optical module in the related art.

FIG. 5 is a structural diagram of an airtight package of an optical module in the related art. FIG. 6 is an exploded view of an airtight package of an optical module in the related art. As shown in FIGS. 5 and 6, in the related art, an airtight package 600 of the optical module 200 mainly includes a metal cover plate 610, a metal package 620, and a ceramic circuit board 630, and the metal package 620 includes a package opening 621 and a metal socket 622. The metal cover plate 610 covers the package opening 621 located at an upper portion of the metal package 620, the metal cover plate 610 and the metal package 620 form a sealed cavity, and optical elements such as the light-emitting assembly 400 or the light receiving assembly 500 are disposed in the sealed cavity. The metal cover plate 610 covers the package opening 621 of the metal package 620, so as to form the sealed cavity through the metal cover plate 610 and the metal package 620, thereby ensuring the sealing performance of the airtight package 600 to the optical elements. The metal socket 622 is disposed on a side of the metal package 620, and the metal socket 622 is communicated with the sealed cavity; one end of the ceramic circuit board 630 is inserted into the metal package 620 through the metal socket 622 and is sealed and soldered with the metal package 620. The ceramic circuit board 630 is provided with metal circuits, and the optical elements in the sealed cavity of the airtight package 600 are electrically interconnected with the circuit board 300 through the metal circuits on the ceramic circuit board 630.

For example, the ceramic circuit board 630 is inserted into the metal package 620 through the metal socket 622, and then the optical elements are placed in the sealed cavity of the airtight package 600; after the optical elements are electrically connected to the ceramic circuit board 630, the metal cover plate 610 is encapsulated with the metal package 620 through a parallel sealing process, so as to realize the airtight encapsulation of the airtight package 600. After the ceramic circuit board 630 and the metal package 620 are soldered together through a high-temperature sintering process, one end of the ceramic circuit board 630 located outside the metal package 620 needs to be connected to the circuit board 300 directly or through a flexible circuit board, and the optical elements in the airtight package 600 are driven to operate through the chips on the circuit board 300.

In the related art, the design manner to realize the encapsulation of the ceramic circuit board 630 and the metal package 620 is as follows: first, the ceramic green body is metallized; for example, pre-designed circuits are fabricated on the ceramic green body by using metal paste (e.g., high-melting-point metal heating resistor pastes of tungsten, molybdenum and manganese) through punching, hole filling, and printing through the high temperature co-fired ceramic (HTCC) process; then the ceramic circuit board 630 is finally manufactured by the processes of lamination, high-temperature sintering, and the like. Then, the ceramic circuit board 630 and the metal package 620 are soldered together through a high-temperature sintering process, so as to realize electrical interconnection inside and outside the airtight package 600 while maintaining the airtightness of the airtight package 600.

However, the high-temperature co-fired ceramic process used in the ceramic circuit board 630 of the airtight package 600 in the related art is complex, technically difficult, and costly, and at present, there is no mature solution to realize the signal transmission rate above 10 Gb/s on the ceramic circuit board 630. In order to reduce costs and improve high-speed signal quality, non-airtight packages have been introduced into the field of data centers. However, the non-airtight packages can only be used in the data center computer room with good environment and cannot meet the use in outdoor and other harsh environments, such as wireless 5G and other fields.

Figure 7:
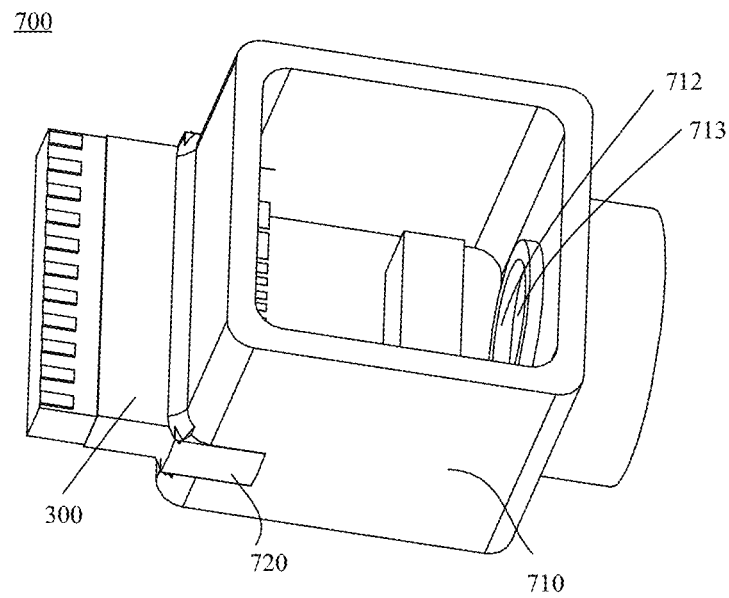
FIG. 7 is a structural diagram of a package in an optical module, in accordance with some embodiments.
Figure 8:
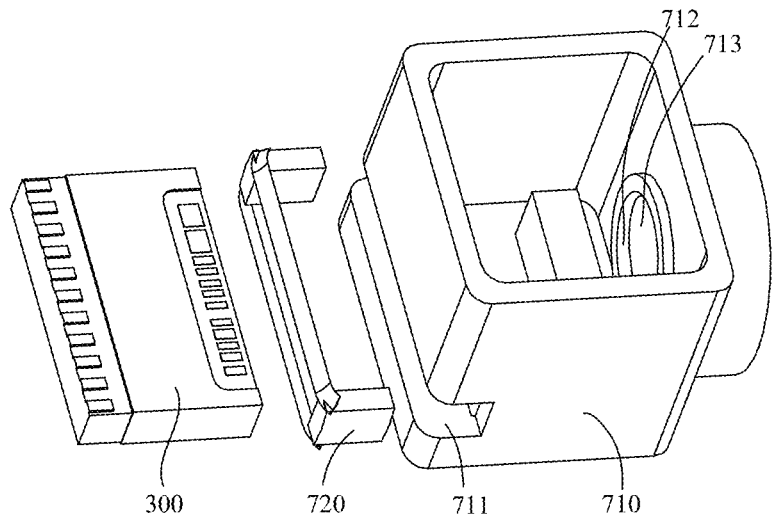
FIG. 8 is an exploded view of a package in an optical module, in accordance with some embodiments.

In order to solve the above problems, in some embodiments of the present disclosure, a package 700 is provided. FIG. 7 is a structural diagram of a package in an optical module, in accordance with some embodiments. FIG. 8 is an exploded view of a package in an optical module, in accordance with some embodiments. As shown in FIGS. 7 and 8, the package 700 in some embodiments of the present disclosure includes a package body 710 (e.g., a metal package) and a soldering member 720 (e.g., a solder member). A cavity is provided inside the package 700. The cavity is, for example, a sealed cavity, and optical elements are encapsulated in the sealed cavity. The package body 710 includes a socket 711 and an optical window opening 712. The socket 711 and the optical window opening 712 are disposed on two opposite sidewalls of the package body 710, one end of the circuit board 300 is inserted into the package body 710 through the socket 711 of the package body 710, and the optical window opening 712 is configured to realize optical communication with information transmission devices such as optical fibers or optical waveguides.

In some embodiments of the present disclosure, the package body 710 further includes an optical window 713 mounted at the optical window opening 712, so as to realize the sealing of the optical window opening 712 of the package body 710, and the optical window 713 may be a glass sheet that allows light to pass through. An optical fiber adapter is connected to the optical window opening 712 of the package body 710 and transmits beams to the optical elements in the package 700 through the optical window 713.

In some embodiments of the present disclosure, in order to enhance the transmittance of the optical window 713 and prevent light reflection from affecting the performance of the optical elements in the sealed cavity of the package 700, during installation, the optical window 713 is usually inclined at a preset angle (usually 8°) relative to a surface where the optical window opening 712 is located. For example, in a case where a normal direction of the optical window opening 712 is a horizontal direction, the surface where the optical window opening 712 is located is in a vertical direction, and in this case, an included angle between the optical window 713 and the vertical direction is the preset angle. Moreover, the surface of the optical window 713 is coated with an anti-reflection film corresponding to a wavelength of light emitted by the light-emitting assembly 400 or a wavelength of the light received by the light receiving assembly 500, so as to enhance the transmittance of the light.

The light-emitting assembly 400 includes optical elements such as a laser, a collimating lens, a converging lens, an optical isolator, an optical multiplexer, an optical fiber coupler, and a thermoelectric cooler. The position of the laser is close to the circuit board 300 inserted into the package body 710 and away from the optical window opening 712, so as to facilitate the electrical connection between the laser and the circuit board 300 through wire bonding, thereby driving the laser to emit beams. The lens (including the collimating lens and/or the converging lens) is disposed between the laser and the optical window opening 712 and is close to the optical window opening 712 of the package body 710. In this way, the beams emitted by the laser enter the lens, and a divergent beam is converted into a converging beam through the lens, and the converging beam is converged and coupled into the optical fiber adapter through the optical window 713 to realize light emission.

The light receiving assembly 500 includes optical elements such as an optical splitter, a lens array, a reflective prism, and an optical collimator. The optical collimator is disposed close to the optical window opening 712 and transmits the optical signal from the optical fiber adapter to the optical splitter, and the optical splitter demultiplexes a composite beam into a plurality of (e.g., 4 or 8) laser beams. The plurality of laser beams are converged to an optical receiver (e.g., the light receiver being a PIN diode or an avalanche diode) through the lens array, so as to realize light reception. The lens array is disposed close to the optical window opening 712 of the package body 710. The lens array, the optical receiver, and the trans-impedance amplifier are sequentially disposed in the package body 710 along an optical path transmission direction, and the optical receiver and the trans-impedance amplifier are electrically connected to the circuit board 300 through wire bonding. In this way, the divergent beam transmitted by the optical fiber adapter is transmitted to the lens array through the optical window 713 and converted into a collimated beam through the lens array; the collimated beam enters the optical receiver, and the optical receiver converts the received optical signal into an electrical signal and outputs the electrical signal to the trans-impedance amplifier; and the electrical signal amplified by the trans-impedance amplifier is transmitted to the circuit board 300 to realize light reception.

In some embodiments of the present disclosure, after the circuit board 300 is inserted into the package body 710, a gap between the circuit board 300 and the package body 710 is sealed through the soldering member 720. In order to facilitate the soldering of the package body 710 and the soldering member 720, a surface of the socket 711 of the package body 710 has a metal layer, and the package body 710 and the soldering member 720 are directly soldered to each other. In some embodiments of the present disclosure, the metal layer on the surface of the socket 711 is made of metal that is easy to be soldered with the soldering member 720 (e.g., the solder member), and the metal layer is, for example, a gold-coated layer or a nickel-coated layer.

Figure 9:
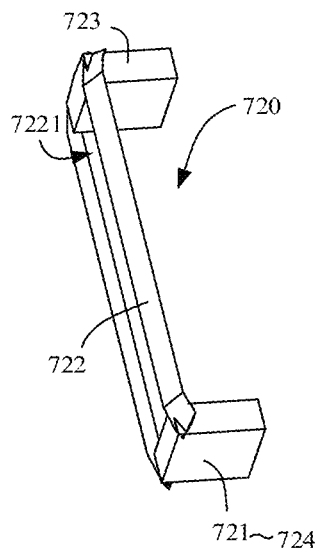
FIG. 9 is a structural diagram of a soldering member in an optical module, in accordance with some embodiments.

FIG. 9 is a structural diagram of a soldering member in an optical module, in accordance with some embodiments. As shown in FIG. 9, in some embodiments of the present disclosure, the soldering member 720 may be a structural member. The soldering member 720 includes a first side plate 721, a second side plate 722, and a third side plate 723. The first side plate 721 is opposite to the third side plate 723, and the first side plate 721 and the third side plate 723 are located on a side of the second side plate 722 close to the sealed cavity; and two ends of the second side plate 722 are connected to the first side plate 721 and the third side plate 723. The second side plate 722 includes a through hole 7221 through which the circuit board 300 is inserted into the cavity of the package 700.

When the circuit board 300 is soldered to the package body 710 through the soldering member 720, the first side plate 721 and the third side plate 723 of the soldering member 720 are soldered to positions of the package body 710 where the socket 711 is provided. After the circuit board 300 is inserted into the cavity of the package 700, the circuit board 300 and the soldering member 720 are soldered to each other. In this way, the gap between the circuit board 300 and the package body 710 is completely sealed through the soldering member 720, which makes the cavity of the package 700 the sealed cavity and the package 700 an airtight package.

In some other embodiments of the present disclosure, the soldering member 720 includes a soldering material. After the circuit board 300 is inserted into the package 700 through the socket 711 of the package body 710, the soldering material is applied to the gap between the circuit board 300 and the package body 710, and the soldering material is soldered to the package body 710 and the circuit board 300, and finally the gap between the circuit board 300 and the package body 710 is completely sealed.

In some embodiments of the present disclosure, the soldering member 720 includes a solder paste, a solder sheet, or a solder wire.

Figure 10:
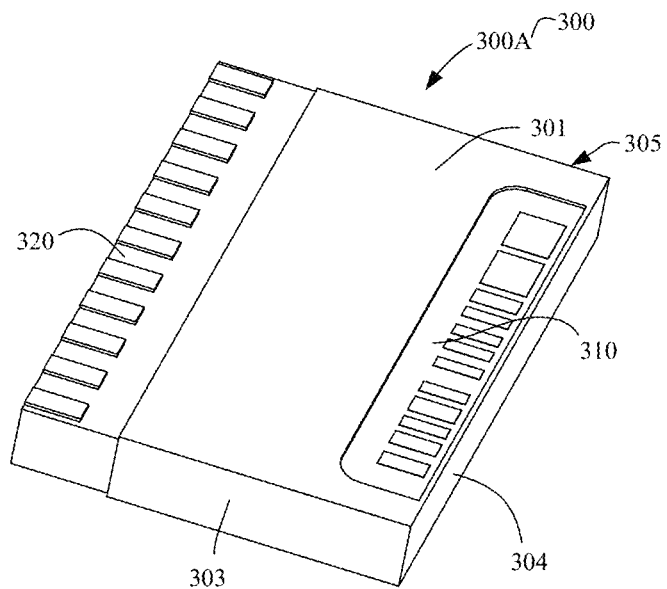
FIG. 10 is a structural diagram of a circuit board in an optical module, in accordance with some embodiments.
Figure 11:
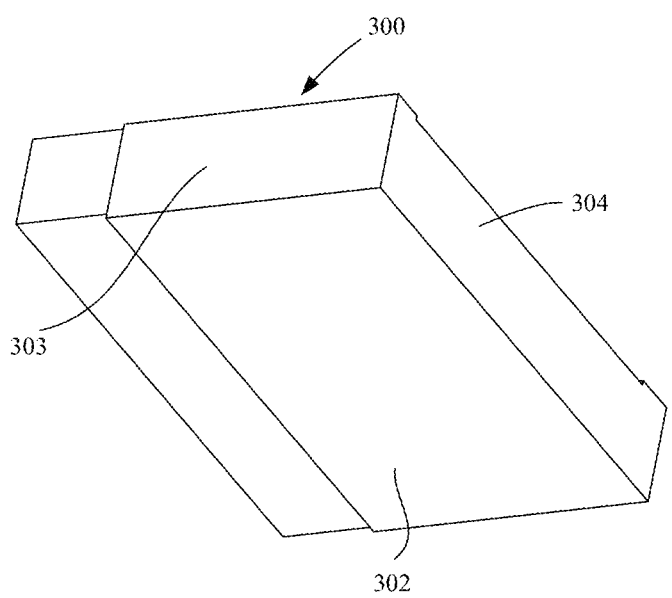
FIG. 11 is a structural diagram of a circuit board in an optical module from another perspective, in accordance with some embodiments.

FIG. 10 is a structural diagram of a circuit board in an optical module, in accordance with some embodiments. FIG. 11 is a structural diagram of a circuit board in an optical module from another perspective, in accordance with some embodiments. As shown in FIGS. 10 and 11, the circuit board 300 includes a circuit board body 300A, an upper surface 301, a lower surface 302, a first side 303, a second side 304, and a third side 305. The upper surface 301 is disposed opposite to the lower surface 302, and the upper surface 301 is disposed toward the upper shell 201 of the optical module 200. The first side 303 is disposed opposite to the third side 305, and two ends of the second side 304 are connected to the first side 303 and the third side 305, respectively.

In some embodiments of the present disclosure, the circuit board 300 includes a rigid multi-layer printed circuit board (PCB), and boards of the PCB are bonded together through an adhesive, and layers of the PCB are bonded together through an adhesive. The PCB is generally a copper clad laminate, and the copper clad laminate includes a substrate, a copper foil, and an adhesive. The substrate is an insulating laminate composed of polymer synthetic resin and reinforcing materials. The surface of the substrate is covered with a layer of pure copper foil with high conductivity and good weldability. A copper clad laminate with copper foil covered on one side of the substrate is called a single-sided copper clad laminate, and a copper clad laminate with copper foil covered on both sides of the substrate is called a double-sided copper clad laminate. The ceramic circuit board 630 in the related art is different from the circuit board 300 provided in some embodiments of the present disclosure.

Figure 12:
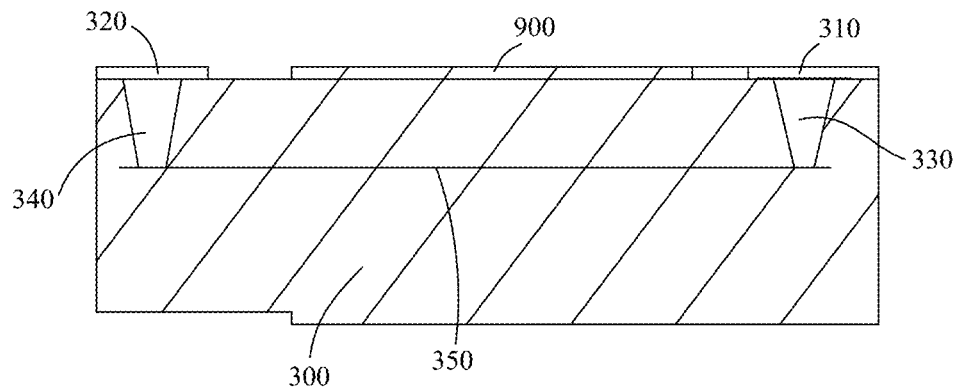
FIG. 12 is a sectional view of a circuit board in an optical module, in accordance with some embodiments.

In order to facilitate blocking and soldering the gap between the circuit board 300 and the package body 710 through the soldering member 720, the optical module 200 further includes a water vapor barrier layer 900 (as shown in FIG. 12), and the water vapor barrier layer 900 is located at the connection between the circuit board 300 and the socket 711. In some embodiments of the present disclosure, the water vapor barrier layer 900 includes a metal layer. For example, the metal layer may include a copper layer, and the surface of the copper layer is coated with a gold layer, and the circuit board 300 is soldered to the soldering member 720 through the water vapor barrier layer 900. The soldering member 720 is located in the gap between the water vapor barrier layer 900 of the optical module 200 and the socket 711, and the water vapor barrier layer 900 is soldered and fixed to the socket 711 through the soldering member 720, so as to realize the hermetic encapsulation of the package body 710 and the circuit board 300. In some embodiments of the present disclosure, the water vapor barrier layer 900 may be applied to portions of the circuit board 300 where the upper surface 301, the lower surface 302, the first side 303, and the third side 305 are inserted into the package 700, and the water vapor barrier layer 900 may be applied to portions of these surfaces where no portion of the package 700 is inserted that need to be soldered to the soldering member 720, and may not be applied to the remaining portions. In this way, it is not only convenient for the upper surface 301, the lower surface 302, the first side 303, and the third side 305 of the circuit board 300 to be soldered and fixed to the soldering member 720, but it also prevents external water vapor from penetrating into the inside of the package 700 through the gap between the circuit board 300 and the package body 710, which affects the performance of the optical elements disposed in the package 700.

Since the circuit board 300 is of a multi-layer board structure, the boards of the circuit board 300, and the joints between layers of the circuit board 300 are easily penetrated by water vapor. In order to prevent water vapor from penetrating into the package 700 through the circuit board 300, some embodiments of the present disclosure further provide a water vapor barrier layer 900 on the second side 304 of the circuit board 300.

Figure 13:
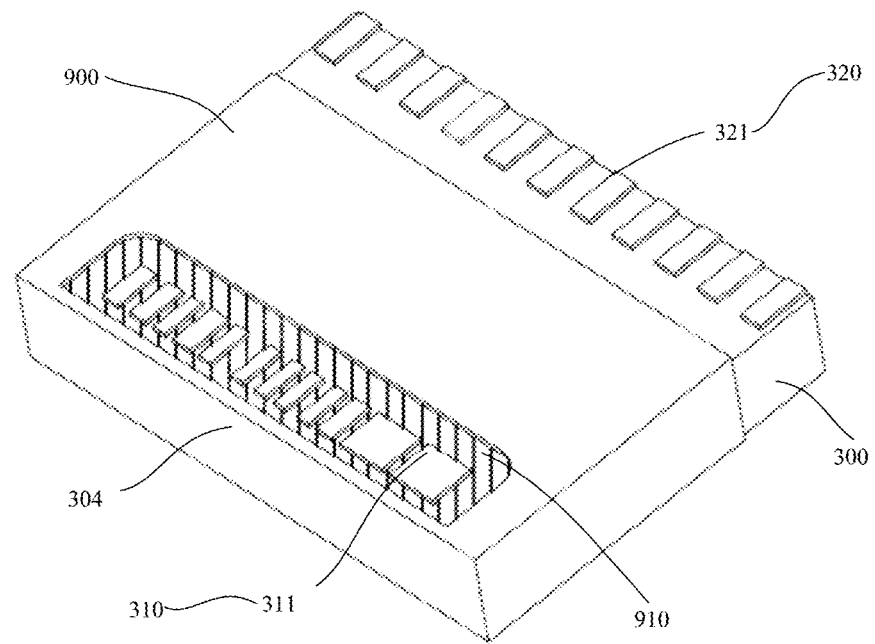
FIG. 13 is another structural diagram of a circuit board in an optical module, in accordance with some embodiments.
Figure 14:
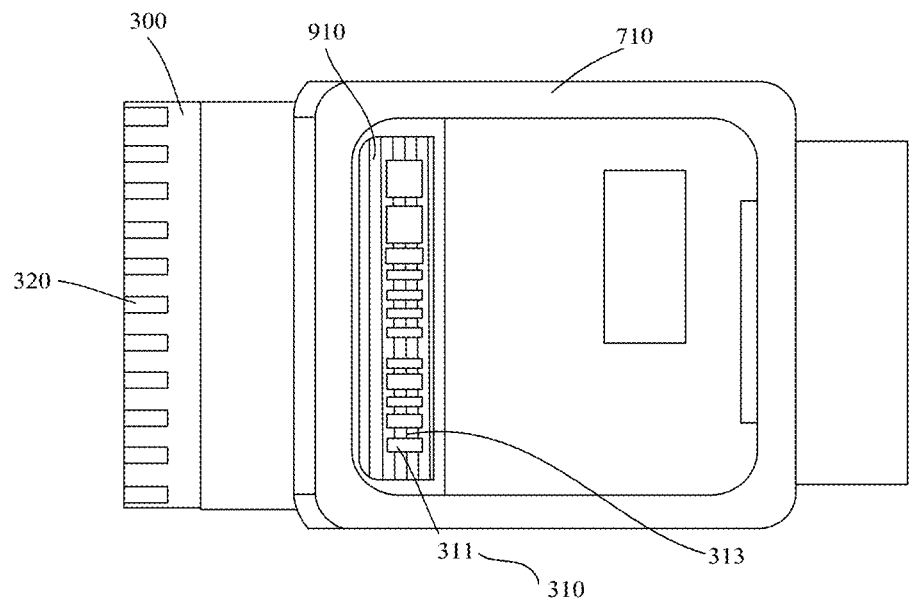
FIG. 14 is an assembly diagram of a package body and a circuit board in an optical module, in accordance with some embodiments.
Figure 15:
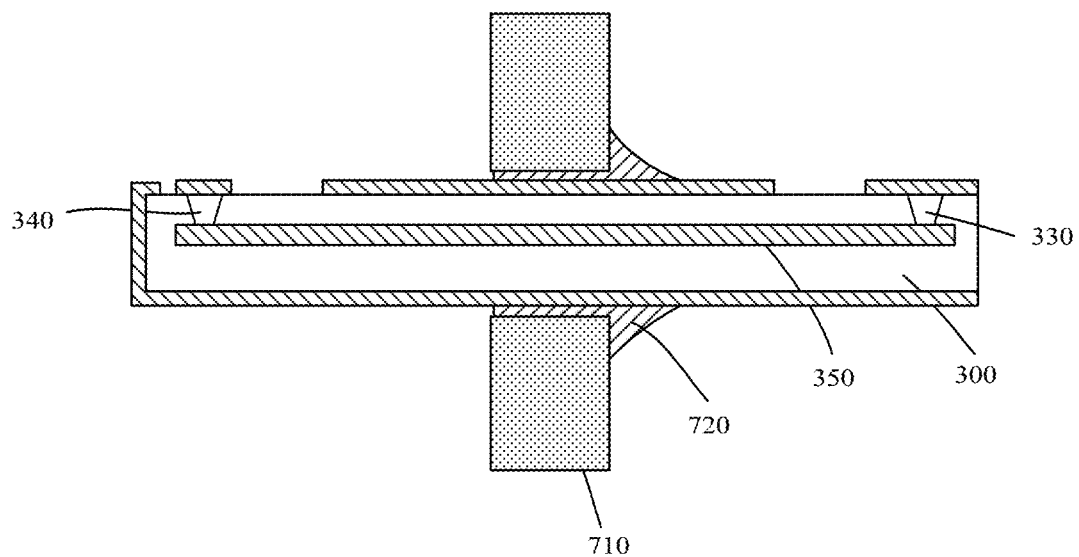
FIG. 15 is a partial assembly sectional view of a circuit board and a package body in an optical module, in accordance with some embodiments.

FIG. 12 is a sectional view of a circuit board in an optical module, in accordance with some embodiments. FIG. 13 is another structural diagram of a circuit board in an optical module, in accordance with some embodiments. FIG. 14 is an assembly diagram of a package body and a circuit board in an optical module, in accordance with some embodiments. FIG. 15 is a partial assembly sectional view of a circuit board and a package body in an optical module, in accordance with some embodiments. As shown in FIGS. 10, 12 and 15, the circuit board 300 further includes a first circuit 310, a second circuit 320, and an internal circuit 350. The first circuit 310 is disposed on an end of the circuit board body 300A inserted into the package 700, the second circuit 320 is disposed on an end of the circuit board body 300A opposite to the first circuit 310 and located outside the package 700, and the internal circuit 350 is located on a middle layer of the circuit board body 300A. One end of the internal circuit 350 is electrically connected to the first circuit 310, and another end of the internal circuit 350 is electrically connected to the second circuit 320.

Since the upper surface 301 and the lower surface 302 of the circuit board 300 each are covered with the water vapor barrier layer 900, it is impossible to arrange circuit traces. In order to realize the electrical connection, the optical elements in the package 700 are electrically connected to the first circuit 310, and the first circuit 310 is electrically connected to the second circuit 320 through the internal circuit 350 of the circuit board 300. In this way, the circuit traces may be led to the internal circuit 350 located on the middle layer of the circuit board 300, and then the circuit traces may be led back to the surface of the circuit board 300.

In order to realize the electrical connection between the first circuit 310, the second circuit 320 and the internal circuit 350 of the circuit board 300, the circuit board 300 further includes a first via 330 and a second via 340. The first via 330 is disposed between the first circuit 310 and the internal circuit 350, and the first circuit 310 is electrically connected to the internal circuit 350 through the first via 330. The second via 340 is disposed between the second circuit 320 and the internal circuit 350, and the second circuit 320 is electrically connected to the internal circuit 350 through the second via 340. In some embodiments of the present disclosure, both the first via 330 and the second via 340 are blind holes, and walls of the first via 330 and the second via 340 each are provided with a conductive material, so that the first via 330 is communicated with the first circuit 310 and the internal circuit 350, and the second via 340 is communicated with the second circuit 320 and the internal circuit 350.

In some embodiments of the present disclosure, the first circuit 310 and the second circuit 320 each may include a circuit pad, and a plurality of circuit pads are sequentially disposed along a width direction of the circuit board 300. In some embodiments, the width direction of the circuit board 300 is perpendicular to the normal direction of the optical window opening 712. For example, as shown in FIG. 13, the first circuit 310 may include a plurality of first circuit pads 311, and the plurality of first circuit pads 311 are sequentially disposed along the width direction of the circuit board 300. The second circuit 320 may include a plurality of second circuit pads 321, and the plurality of second circuit pads 321 are sequentially disposed along the width direction of the circuit board 300.

As shown in FIGS. 12 to 14, in some embodiments of the present disclosure, the water vapor barrier layer 900 includes an exposed region 910, and the exposed region 910 is disposed at the end of the circuit board 300 inserted into the package body 710 and is located on the upper surface 301 of the circuit board body 300A. In some embodiments, the exposed region 910 is formed by peeling off a part of the water vapor barrier layer 900, however, the present disclosure is not limited thereto. A bottom surface of the exposed region 910 is the upper surface 301 of the circuit board 300, and the upper surface of the exposed region 910 is the upper surface of the water vapor barrier layer 900. The first circuit 310 is disposed on the bottom surface of the exposed region 910 of the water vapor barrier layer 900.

Figure 16:
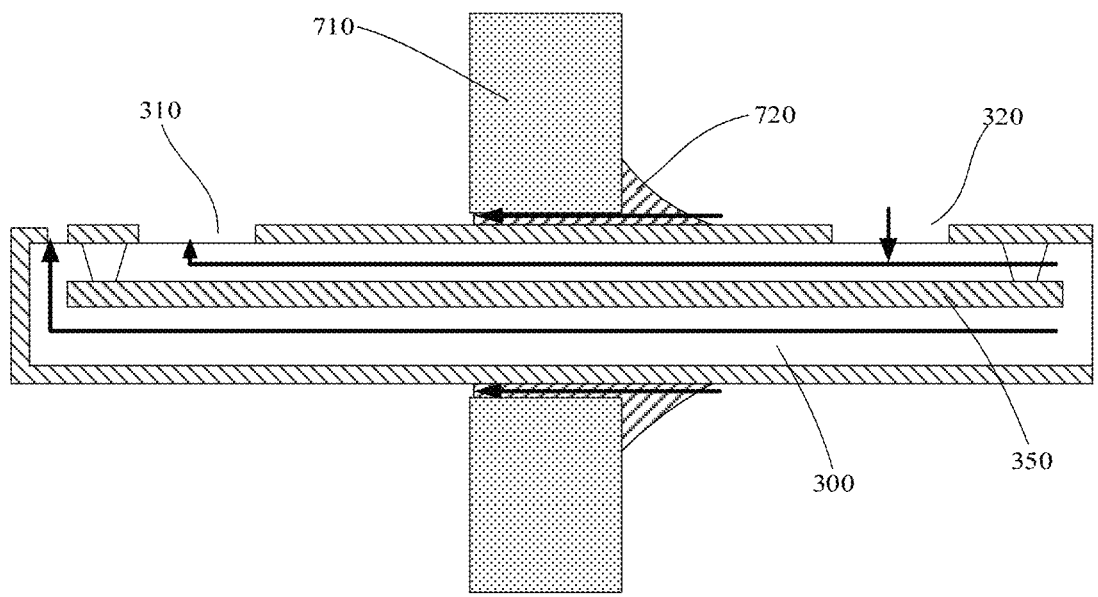
FIG. 16 is a diagram showing a path where water vapor penetrates into a package from the inside of a circuit board in an optical module, in accordance with some embodiments.

FIG. 16 is a diagram showing a path where water vapor penetrates into a package from the inside of a circuit board in an optical module, in accordance with some embodiments. As shown in FIG. 16, due to the problem when the circuit board 300 and the soldering member 720 are soldered to each other, such as air bubbles and even cracks may be generated at the soldering portion of the two parts, which will lead to air leakage between the package body 710 and the circuit board 300 at the soldering portion, thus causing water vapor to penetrate into the inside of the package 700 from the bubbles and cracks at the soldering portion and affecting the performance of the optical elements in the package 700.

In order to solve the above problem, in some embodiments of the present disclosure, after the package body 710 and the circuit board 300 are soldered together through the soldering member 720, a first waterproof layer 724 (referring to FIG. 9) is coated on a side of the first side plate 721, the second side plate 722, and the third side plate 723 of the soldering member 720 away from the cavity, and the first waterproof layer 724 covers the outer surface of the soldering member 720. In this way, water vapor is prevented from penetrating into the inside of the package 700 from the bubbles or cracks of the soldering member 720. In some embodiments of the present disclosure, the first waterproof layer 724 may include a glue layer, which can prevent water vapor from penetrating into the inside of the package 700 after the glue is cured.

In some embodiments, external water vapor may also enter the gap between the layers of the circuit board 300 through the portion of the circuit board 300 that is not inserted into the package body 710 where the water vapor barrier layer 900 is not applied, and penetrate into the inside of the package 700 through the gap between the bottom surface of the exposed region 910 of the water vapor barrier layer 900 and the first circuit 310, thereby affecting the performance of the optical elements inside the package 700.

In order to solve the above problems, in some embodiments of the present disclosure, after the first circuit 310 is electrically connected to the internal circuit 350 of the circuit board 300, a second waterproof layer 313 (referring to FIG. 14) is provided at the gap between the first circuit 310 and the bottom surface of the exposed region 910. In this way, even if there is water vapor inside the circuit board 300, the second waterproof layer 313 may block the water vapor, and the water vapor cannot enter the inside of the package 700 from the exposed region 910.

In some embodiments of the present disclosure, the second waterproof layer 313 may include a glue layer, and the bottom surface of the exposed region 910 is recessed toward the circuit board 300 relative to the water vapor barrier layer 900, so that the glue will not flow around, and the glue will form a waterproof layer after curing, which may prevent water vapor from penetrating therethrough.

Figure 17:
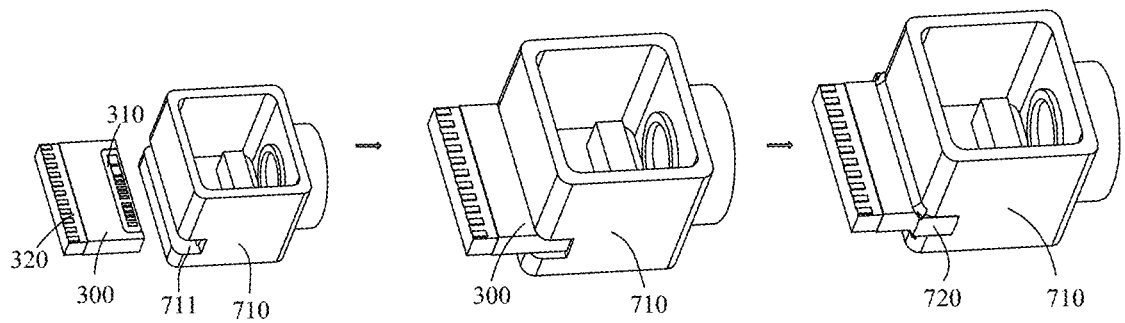
FIG. 17 is a diagram showing an assembly process of a circuit board and a package body in an optical module, in accordance with some embodiments.

FIG. 17 is a diagram showing an assembly process of a circuit board and a package body in an optical module, in accordance with some embodiments. As shown in FIGS. 13 to 15 and FIG. 17, the water vapor barrier layer 900 is applied to portions of the circuit board 300 inserted into the package body 710 on each side of the circuit board 300. The exposed region 910 is disposed at the end of the circuit board 300 inserted into the package body 710, the first circuit 310 is disposed on the exposed region 910, and the second waterproof layer 313 is provided at the gap between the first circuit 310 and the bottom surface of the exposed region 910. The second circuit 320 is disposed at an end of the circuit board 300 that is not inserted into the package body 710, and the internal circuit 350 is disposed at the middle layer of the circuit board 300. The first via 330 is disposed between the first circuit 310 and the internal circuit 350, and the second via 340 is disposed between the second circuit 320 and the internal circuit 350. After cleaning the circuit board 300 and the package body 710 by means of plasma cleaning or ultrasonic cleaning, the circuit board 300 is inserted into the package body 710 through the socket 711, so that the first circuit 310 is located in the cavity of the package body 710, and the second circuit 320 is located outside the cavity of the package body 710, and if necessary, glue may be used to pre-fix the junction of the two parts; then, the package body 710 and the circuit board 300 are soldered together through the soldering member 720.

After encapsulating the package 700, the staff needs to perform visual inspection and leak detection to detect the assembly tightness of the circuit board 300 and the package body 710, so as to prevent external water vapor from penetrating into the inside of the package 700 through the gap between the circuit board 300 and the package body 710.

A person skilled in the art will understand that the disclosed scope of the present disclosure is not limited to the specific embodiments described above, and some elements of the embodiments may be modified and replaced without departing from the spirit of the present disclosure. The scope of the present disclosure is limited by the appended claims.

What is claimed is:

1. An optical module, comprising:
   a housing;
   a circuit board located in the housing, and the circuit board including:
     a circuit board body;
     an upper surface;
     a lower surface disposed opposite to the upper surface;
     a first circuit, the first circuit being disposed on the upper surface;
     a second circuit, the second circuit being disposed on the upper surface;
     an internal circuit, the internal circuit being disposed on a middle layer of the circuit board body;
     a first via, the first via being disposed between the first circuit and the internal circuit; and
     a second via, the second via being disposed between the second circuit and the internal circuit;
   a package located in the housing, and the package including a package body and a soldering member, the soldering member being located in a gap between the circuit board and the package body;
     the package body including:
       a cavity, the first circuit being disposed on an end of the circuit board body inserted into a cavity; the second circuit being disposed on an end of the circuit board body opposite to the first circuit and located outside the package body;
       a socket, the socket being communicated with the cavity, and an end of the circuit board being inserted into the cavity through the socket;
       an optical window opening, the optical window opening being disposed opposite to the socket; and
       an optical window, the optical window being located at the optical window opening, and
   at least one of a light-emitting assembly or a light receiving assembly, the light-emitting assembly or the light receiving assembly being located in the cavity and being electrically connected to the circuit board, the light-emitting assembly being configured to convert an electrical signal from the circuit board into an optical signal and emit the optical signal to an outside of the optical module, the light receiving assembly being configured to convert the optical signal from the outside of the light module into an electric signal and transmit the electric signal to the circuit board; at least one of the light-emitting assembly or the light receiving assembly being electrically connected to the first circuit, and the first circuit being electrically connected to the second circuit through the internal circuit;
   wherein at least one of the optical signal emitted by the light-emitting assembly or the optical signal received by the light receiving assembly is transmitted through the optical window;
   an extension direction of the internal circuit is parallel to a normal direction of the optical window opening; and
   the first circuit is electrically connected to the internal circuit through the first via, and the second circuit is electrically connected to the internal circuit through the second via.

2. The optical module according to claim 1, wherein a surface of the socket connected to the soldering member has a metal layer.

3. The optical module according to claim 2, wherein the metal layer includes a gold-coated layer or a nickel-coated layer.

4. The optical module according to claim 1, wherein the optical window is inclined at a preset angle relative to a surface where the optical window opening is located.

5. The optical module according to claim 1, wherein the soldering member includes a first side plate, a second side plate, and a third side plate, the first side plate is disposed opposite to the third side plate, and two ends of the second side plate are connected to the first side plate and the third side plate, respectively; and
   wherein the second side plate includes a through hole, and the circuit board is inserted into the cavity through the through hole.

6. The optical module according to claim 5, wherein the first side plate and the third side plate are soldered with positions of the package body where the socket is provided, and the circuit board is soldered with the soldering member.

7. The optical module according to claim 1, wherein the soldering member includes a soldering material, and the soldering material is filled in the gap between the circuit board and the package body.

8. The optical module according to claim 7, wherein the soldering material includes a solder paste, a solder sheet, or a solder wire.

9. The optical module according to claim 1, wherein the circuit board further includes a first side and a third side opposite to each other, and the first side and the third side are located between the upper surface and the lower surface; and
   wherein the upper surface, the lower surface, and portions of the first side and the third side inserted into the cavity each have a water vapor barrier layer.

10. The optical module according to claim 9, wherein the water vapor barrier layer includes a metal layer.

11. The optical module according to claim 10, wherein the metal layer includes a copper layer, and a gold layer is coated on a surface of the copper layer.

12. The optical module according to claim 9, wherein a side of the soldering member away from the circuit board has a first waterproof layer.

13. The optical module according to claim 9, wherein
   the water vapor barrier layer includes an exposed region;
   wherein a bottom surface of the exposed region is the upper surface of the circuit board; and the first circuit is disposed on the bottom surface of the exposed region.

14. The optical module according to claim 9, wherein the circuit board further includes a second side, the second side is connected to the upper surface, the lower surface, the first side, and the third side, the second side is inserted into the cavity, and the second side has the water vapor barrier layer.

15. The optical module according to claim 14, wherein the water vapor barrier layer includes a metal layer.

16. The optical module according to claim 15, wherein the metal layer includes a copper layer, and a gold layer is coated on a surface of the copper layer.

17. The optical module according to claim 14, wherein a side of the soldering member away from the circuit board has a first waterproof layer.

18. The optical module according to claim 14, wherein the water vapor barrier layer includes an exposed region; and wherein a bottom surface of the exposed region is the upper surface of the circuit board; and the first circuit is disposed on the bottom surface of the exposed region.

19. The optical module according to claim 18, wherein a second waterproof layer is provided at a gap between the first circuit and the bottom surface of the exposed region.

* * * * *